Dec. 2, 1941.　　　H. F. SHINDEL　　　2,264,412
APPARATUS FOR TESTING FRANGIBILITY
Filed Dec. 16, 1938　　　3 Sheets-Sheet 1
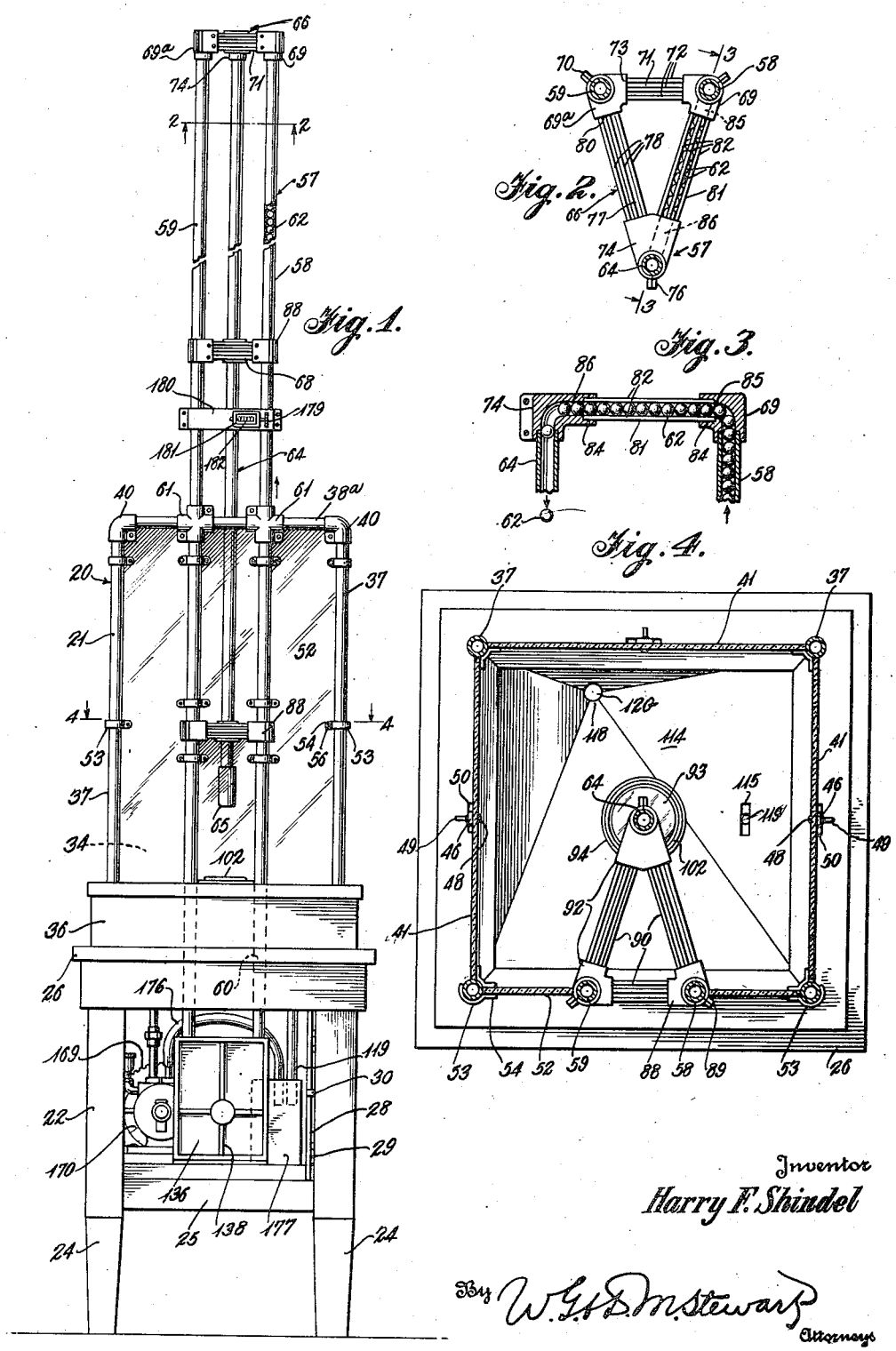
Inventor
Harry F. Shindel
By W.G.&D.M.Stewart
Attorneys Dec. 2, 1941.     H. F. SHINDEL     2,264,412
APPARATUS FOR TESTING FRANGIBILITY
Filed Dec. 16, 1938     3 Sheets-Sheet 2

Inventor
Harry F. Shindel

Dec. 2, 1941. H. F. SHINDEL 2,264,412
APPARATUS FOR TESTING FRANGIBILITY
Filed Dec. 16, 1938 3 Sheets-Sheet 3

Inventor
Harry F. Shindel
By W.G.&D.M.Stewart
Attorney

Patented Dec. 2, 1941

2,264,412

UNITED STATES PATENT OFFICE 2,264,412

APPARATUS FOR TESTING FRANGIBILITY

Harry F. Shindel, Reading, Pa., assignor to Willson Products, Inc., Reading, Pa., a corporation of Pennsylvania Application December 16, 1938, Serial No. 246,233

7 Claims. (Cl. 73—51)

This invention relates to apparatus for testing articles, and more particularly to apparatus for testing the strength of articles.

In the manufacture of safety goggles, industrial masks and like devices, it is frequently essential to include transparent eye-protecting lenses of glass which have been specially treated for hardening to insure their ability to withstand blows of flying particles or tools without shattering. In some instances, such lenses are made of glass hardened by a desired quality of heat treatment, and such lenses have been found highly dependable in resisting blows of hard objects. To determine the suitability of such lenses before use, they require testing of an order to establish their strength, and in providing a quantity of such lenses for a particular use or type of goggle it is desirable to subject all such lenses to the same test in order, by inspection, to enable rejection of any lens found too breakable for service in the particular type of goggle.

Various proposals for testing goggle lenses have been considered and experimented with, one of the most simple and yet satisfactory being the ball test, during which the lens is held stationary in the horizontal plane in a chuck, a metal ball of a certain weight being dropped perpendicularly thereon from a given height a predetermined number of times. The quality of the lens for service under practical conditions can thereby be conveniently determined. Such method of test is elastic and is readily capable of necessary variation as circumstances require by modifying the weight of the ball, the distance it is dropped and/or the number of blows delivered upon the lens. If a lens is subjected to such test of requisite intensity and is found not to shatter or chip, the lens is then passed for use and mounted in the goggle with assurance that it is sufficiently hard to withstand blows of commensurate or lesser force in service.

It is a primary object of the invention to provide apparatus for testing articles which will be simple, efficient and durable.

Another object of the invention is to provide for the automatic control of successive tests to the same or different articles.

Another object of the invention is to provide apparatus for testing articles which will be at once spectacular and mystifying.

Another object of the invention is to provide for the convenient and reliable testing of articles in succession, the several articles being subjected to the same tests.

Another object of the invention is to provide an efficient apparatus for effecting tests on articles, designed so as to be attractive to the eye in order to render it suitable for display and advertising purposes.

Another object of the invention is to provide an apparatus for testing articles which will be simple and efficient in construction and capable of operation without requiring skilled labor.

One form of the invention may be practiced with a testing cabinet of tower-like appearance, including a foundation housing, a table thereon, a test chamber on the table and a superposed ball tower. The article to be tested is held on the table by a suction air chuck while a motor-driven impeller in the housing forces a series of steel balls up through the tower to cause the balls to drop successively on the lens in the test chamber. After dropping, the balls gather in the table and are fed by gravity successively into the impeller, which again forces them upward through the elevator tower. The housing is designed to afford convenient access to the actuating mechanism while being provided with hinged doors on all sides to permit the mechanism to be entirely enclosed. The testing chamber is enclosed with pivoted plates of sheet-like cellulosic material, such to be transparent to permit clear observation of a tested article and yet shatterproof to avoid damage by the falling balls or shattered fragments of the lens under test. The elevator tower is triangular in cross section and composed of tubular metal stock corresponding in appearance to the tubular framework of the testing chamber. The steel balls are pushed upwardly through one of the tubular tower members; however, due to such member being identical in outward appearance with the other tower members, it is difficult to determine how the steel balls are continuously supplied for dropping from the top of the tower, and hence their rapid emergence from the tower top to fall on the test article in the chamber below excites the curiosity of the observer as well as presenting an interesting and attractive portrayal of the conduct of reliable tests at high speed.

A modified form of the invention contemplates a more simple structure for manual operation, including a simple horizontal anvil for receiving the lens and a pivoted arm having at one end a pawl for engaging the balls successively and advancing them through the elevator step by step as the pawl is repeatedly actuated by a foot treadle.

The invention will be more clearly understood by referring to the following detailed description, and the accompanying drawings forming a part thereof, wherein Fig. 1 is a rear elevation of one form of apparatus whereby the invention may be practiced;

Fig. 2 is a bottom plan view taken on the line 2—2 of Fig. 1;

Fig. 3 is a section taken on the line 3—3 of Fig. 2;

Fig. 4 is a section taken on the line 4—4 of Fig. 1;

Figure 5:
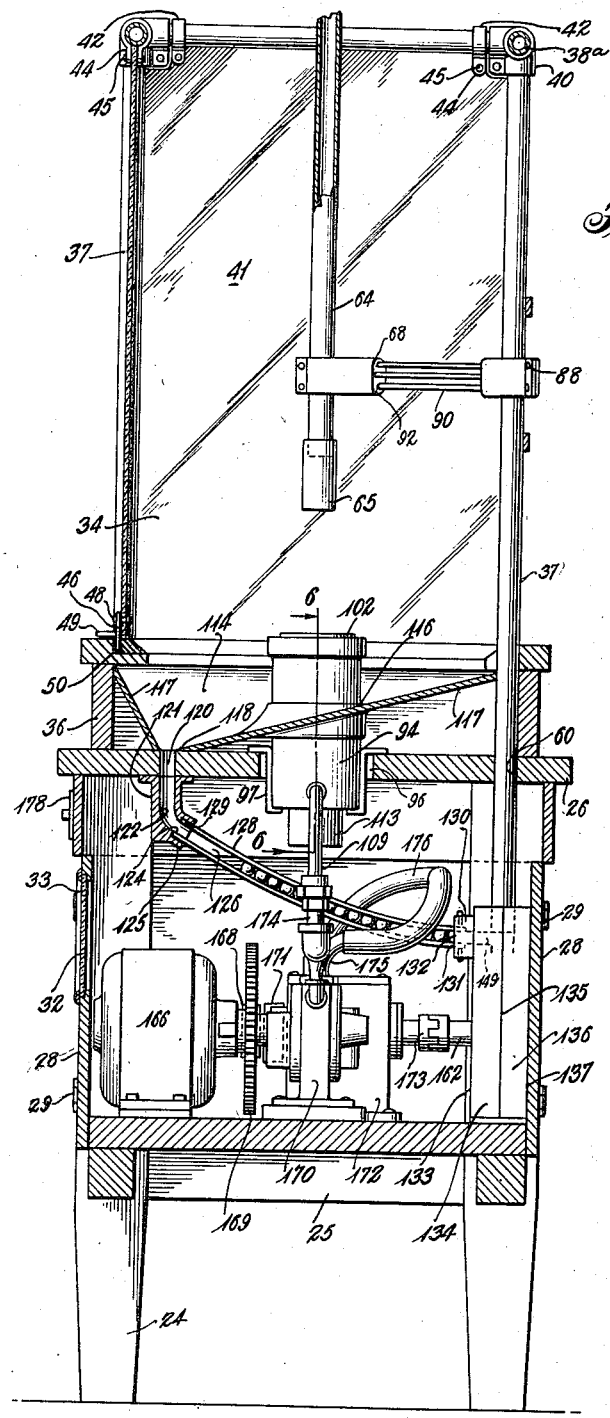
Fig. 5 is a sectional view on an enlarged scale, showing the mechanism for actuating the apparatus of Fig. 1.

Referring to the drawings wherein similar parts are indicated by identical reference numerals, one embodiment of the invention includes the testing apparatus generally designated by the numeral 20 and comprising a rectangular cabinet 21 (Fig. 1) of sturdy wooden frame. Cabinet 21 includes a lower housing 22 having four strong corner legs 24, 24 connected by rectangular braces 25, 25 to form a rigid framework. Atop the housing 22 is a rectangular table portion 26.

The housing 22 may be closed by doors 28, 28, one each of which is provided on a side. Doors 28 swing horizontally on hinges 29—29 at one edge thereof, and each door has a latch 30 at the opposite edge for maintaining the door in closed position to conceal the contents of said housing. One of the said doors 28, which may be referred to as the front door, is provided with a rectangular sight window 32 mounted in a recess 33, whereby the contents of the housing may be inspected without opening the doors 28. This construction appears in Fig. 5.

Table 26 supports a test chamber 34, consisting of a rectangular inclosure defined by a stationary wooden frame 36 fast to the top of table 26. Rigidly connected to frame 36 are four corner posts 37, 37 of tubular stock, which extend upwardly to support horizontal top connectors 38, 38 of similar tubular stock. The corner posts 37 and connectors 38 are rigidly assembled on right angled corner couplers 40, 40 to provide a rigid framework for transparent plates 41, 41. The plates 41 may be of any suitable transparent material; however, it is preferred to provide same of cellulosic or other transparent non-shatterable material in order to eliminate danger of accidental breakage. Forward and side plates 41 are pivotally mounted on corresponding top connectors 38 by spaced collars 42, 42 which swing freely on connectors 38 and have an ear 44 to which the transparent plate 41 may be rigidly fixed, as by screws 45—45. At the opposite or lower edge, forward and side plates 41 have attached adjacent the edges spaced latch fingers 46—46, one end of said fingers being pivotally attached to the plate by pivot screw 48. Intermediate its ends, latch finger 46 carries a lug 49, to be manually engaged in actuating the latch finger; and the end opposite pivot 48 projects for latching engagement in recess 50 formed in stationary frame 36.

Rearward cellulosic plate 52 is fixed against swinging movement, being connected to rearward corner posts 37 by spaced collars 53, 53 in which the tubular members are received. Ears 54 projecting from collars 53 are rigidly connected to the plate 52 as by screws 56.

A ball tower 57 projects upwardly from the rear face of the cabinet, and includes right and left vertical tubes 58 and 59 respectively (Fig. 1) which are braced below in spaced holes 60—60 through table 26. Instead of unitary connector rod 38 along the rear face of the test chamber, there is substituted a connector consisting of three rod elements 38a, 38a, said elements being assembled rigidly in end right-angle couplers 40—40 and united by cross-couplers 61—61. Cross-couplers 61—61 brace spaced tubes 58—59 which project upwardly.

Preferably, in order to enhance the mystery attached to the practice of the invention, the present preferred embodiment contemplates that all the tubular elements described above will have the same external cross-sectional dimension, as well as the same external finish. For example, it has been found that utilizing chromium-plated finish for the tubular stock creates a rich and attractive appearance, as well as imparting to the different pieces of tubular stock an identity of appearance purposely suggestive of an identity of utility.

Although it will be readily apparent to those skilled in the art that articles may appropriately be tested in the drop method by subjecting them to objects of different character and weight, falling from any height requisite to produce the desired quality of blow, the construction of Figs. 1 to 9, inclusive, is designed particularly for testing the strength or resistance to chipping or shattering of glass lenses manufactured for use in industrial safety goggles. As to such lenses, it has been found that a strength test of recognized validity is afforded by dropping on such lens a five-eigths inch polished steel ball from a height of 76 inches. However, it will be understood that the invention is in no wise to be limited to values of this order; rather it is susceptible to efficient utilization with test tools of different character falling through different distances.

Assuming the present apparatus is to employ for lens-testing a solid steel ball polished to a diameter of five-eigths of an inch and dropped 76 inches upon the lens, it is preferred to utilize as tubular stock for the tubular elements described hereinabove tubes having the same external appearance, and that the vertical tube 58 have an internal diameter but slightly greater than five-eigths of an inch, in order to permit the smooth and even passage therethrough of the steel test balls. Such steel test balls 62, 62 are utilized in quantity adequate to supply the circulatory requirements of the apparatus.

Proper aiming of the test balls is accomplished through an elongated drop tube 64 having at its lower extremity a tubular rubber cushion 65 that fits over the drop tube and protects same against chance blows of the test balls. The drop tube is held perpendicularly disposed in the vertical axis of the testing cabinet and, hence, extends parallel to the upright tubes 58 and 59 on the rear.

The latter constitute supports, the drop tube 64 being rigidly connected thereto by a horizontal upper bridge 66 and corresponding spaced lower bridges 68—68. V-shaped brackets 69 and 69a of the upper bridge 66 are fixed to upright tubes 58 and 59, respectively, being bolted or otherwise made fast at 70—70. Channel element 71 connects support tubes 58 and 59 and consists of four rods 72, 72, spaced to define for the channel a rectangular cross section and each having firm attachment in recesses 73, 73 formed in the V-shaped brackets 69 and 69a. The upper bridge also includes V-shaped bracket 74 bolted or otherwise suitably secured at 76 to centered drop tube 64. Referring to Figs. 2 and 3, V-shaped brackets 74 and 69a are connected by a channel 77 of rectangular cross section defined by four rods 78, 78 having ends secured in recesses 80, 80 in said V-shaped brackets. Channel 81 of rectangular cross section extends between V-shaped brackets 74 and 69, being defined by four rods 82, 82 having ends fixed in suitable recesses 84, 84 in said V-shaped brackets.

The foregoing structure, it will be observed, constitutes a rigid assembly of light metal stock which may be polished and otherwise of the type commonly used in the manufacture of medical and/or scientific appliances. The structure in no way indicates the true method of accomplishing the tests, to outward appearances the vertical members 58, 59 and 37 presenting the same structural and functional aspects, namely, to cooperate in sustaining the vertical tube on the housing 22. In order practically to enable conduct of ball tests, however, the V-shaped brackets 69 and 74 are provided with apertures 85 and 86 respectively, axially aligned with defined channel 81. The dimensions of said apertures are such as to be but slightly greater than the circumference of the steel balls 62 and correspond with the cross section of the channel 81 in order that steel test balls 62, 62 may pass silently and successively upwardly through tube 58, through V-shaped bracket 69, aperture 85, channel 81, aperture 86 and into drop tube 64 while in contiguous relation and without clicking or other noise to explain the operation of advancing said test balls.

The lower bridge structure 68—68 each include the V-brackets 88, 88 corresponding to the respective structures vertically aligned therewith in the upper bridge 66, such brackets 88 being bolted or otherwise fixed at points 89 to additionally brace the vertical tubes 58, 59 and 64. The several V-brackets in each of the lower bridges are connected by rods 90, 90 disposed to define an area of rectangular cross-section and fixed in recesses 92, 92 in said brackets. By referring to Fig. 1 it will be observed that the tower structure thus presents three polished tubes in columnar aspect braced at three spaced points by bridges 66 and 68, the outward appearance of the several tubes and the several bridges being identical so as to conceal the fact of the additional function performed by tube 58 and bridge 66 as brought out above.

Figure 6:
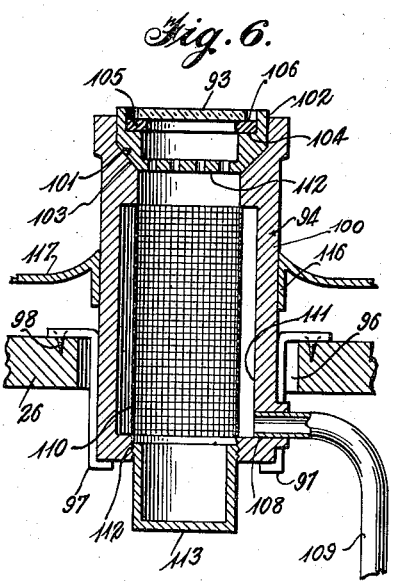
Fig. 6 is an enlarged section detail taken on the line 6—6 of Fig. 5.

Referring particularly to Figs. 5 and 6, a lens 93 or article to be tested is positioned for testing in cylindrical chuck 94 at the vertical axis of the test cabinet. Said chuck is mounted in circular recess 96 provided in table 26 by any suitable brackets 97—97, secured by screws 98. Chuck 94 includes a main barrel portion 100 which projects above table 26 and at its upper end has a bevelled recess 101 in which is wedged a removable sealing ring 102 having a corresponding bevelled face 103 for closely engaging recess 101. Sealing ring 102 has an annular recess 104 for receiving a rubber gasket or saddle 105. Gasket 105 has a flat face 106 against which the lens or other article to be tested seats during the testing operation. At the lower end of the chuck, barrel 100 has a lateral hole 108 in which suction line 109 is fixed with a sealing fit. From the foregoing it will be observed that when a vacuum is created in barrel 100 by exhausting air through line 109, the lens 93 will be maintained firmly in testing position in a horizontal plane against the rubber gasket 105. Upon shattering of lens 93 some of the smaller fragments may pass into the chuck, but screen 110 set in internal chuck recess 111 prevents the fragments from passing through line 109. Such fragments may lodge in cup 113 and be readily disposed of by unscrewing said cup from the barrel to permit emptying; thereafter the cup may be refitted in the barrel and the vacuum again created by placing another lens 93 or article to be tested on the gasket 105 and exhausting the chuck through line 109. Sealing ring 102 has a perforated bottom 112 on which may collect the larger glass fragments. Sealing seat 102 may be removed and turned upside down to dump collected fragments when required.

The floor of the test chamber 34 includes a tray 114 which is shaped like a hopper and is inclined to extend from the walls of the cabinet to collect articles falling thereon. Adjacent the left side, tray 114 is slotted at 115 to which slot a pipe 119 is connected. Glass fragments may be manually brushed into slot 115 for safe disposal. At the center, hopper 114 is recessed at 116 to accommodate chuck 94; but elsewhere surfaces 117, 117 slope toward a repository hole 118 at the lowest point of said hopper. Repository 118 is vertically aligned with hole 120 through table 26 and communicates with tubular casting 121 fast to the undersurface of said table. Tubular casting 121 has a bore 122 communicating with a laterally disposed mouth 124, having a lip 125 axially aligned with a channel 126 of rectangular cross-section defined by four spaced rods 128 fixed in holes 129 in lip 125. By referring particularly to Fig. 5, it will be observed that balls or other test tools dropping from tube 64 upon the test article may roll or fall therefrom into the bottom of the test chamber and will be collected on tray 114 and forwarded in contiguous relation through repository 118 to hole 120 and tubular casting 121 for transfer by way of channel 126.

The opposite ends of channel forming rods 128 are fixed in a perforated metal block 130, said block having recesses 131, 131 in which the rods may be fixed to provide an inclined track down which the contiguous balls 62 may roll smoothly and without noise. The block 130 is hollow, having an aperture 132 axially aligned with the channel 126 for receiving the balls 62. The block 130 is carried on outer surface 133 of forward plate 134 of a cast metal impeller casing 135, fast at the rear of cabinet 21.

Figure 7:
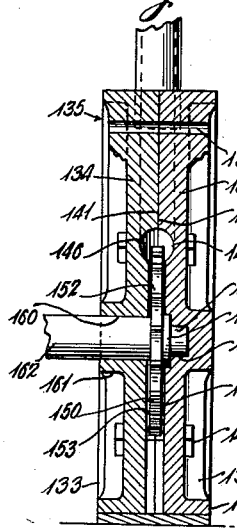
Fig. 7 is an enlarged detail in cross section of the ball impeller and casing.
Figure 8:
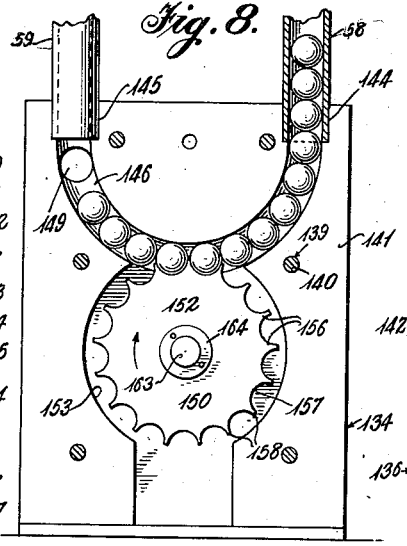
Fig. 8 is a section taken on the line 8—8 of Fig. 7, disclosing the inner face of the forward plate of the impeller casing.
Figure 9:
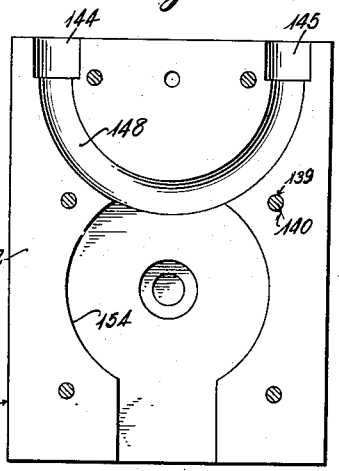
Fig. 9 is a view corresponding to Fig. 8 and showing the inner face of the rearward plate of the impeller casing.

Impeller casing 135 includes a rearward plate 136, having an outer surface 137, said plate corresponding generally in appearance to forward plate 134, both plates having reinforcing ribs 138, 138 for strengthening same. Referring particularly to Figs. 7, 8 and 9, it will be noted the casing plates 134 and 136 are provided with spaced holes 139 for receiving bolts 140 for maintaining the impeller casing in rigid bolted assembly. Forward plate 134 has a smooth inner face 141, and rearward plate 136 has a smooth inner face 142, which lie flush when the impeller casing is assembled. Such plates are preferably formed of separate castings and include complementary sockets 144 and 145 for seating the lower ends of vertical tower tubes 58 and 59 respectively. In each casting, it will be understood, the sockets 144 and 145 are semi-cylindrical; and each communicates with groove 146 and groove 148 on plates 134 and 136 respectively to form a U-shaped communicating way connecting said sockets. Hole 149 is provided in forward plate 134 in alignment with block aperture 132 and communicates with the U-shaped grooves. In the casing construction described, it will be understood that the dimensions of the apertures 132 and 149, as well as the U-shaped communicating grooves are but slightly larger than the diameter of steel balls 62 in order that said balls may pass smoothly therethrough without noise.

An impeller 150, consisting of a metal disc having smooth flat sides 152—152, is mounted in recesses 153—154 in inner faces 141 and 142 respectively of the impeller casing plates. Impeller disc 150 has a serrated periphery 156 composed of adjacent concavities 157, but slightly larger than balls 62, separated by spaced teeth 158, which latter project into the U-shaped communication groove, to lie in the vertical axis of said groove. Forward casting 134 is provided with a central bore 160 surrounded by an external cylindrical bearing 161 for supporting horizontal shaft 162. Shaft 162 has a reduced extremity 163 on which is keyed impeller disc 150. The disc is fixed to the shaft by nut 164 accommodated in recess 165 in the rear casing plate 136.

From the foregoing it will be observed that test balls 62 are advanced by gravity from the collecting tray 114 to the bottom of tower tube 158 while in contiguous relation. The balls enter the impeller casing by way of aperture 149 and move downwardly in the U-shaped groove where they are engaged by the impeller 150. Each ball is received in one of the concavities 157 and advanced to the right, as seen in Fig. 8, by the spaced teeth 158, the series of balls being so actuated by the successive impeller teeth when the impeller is rotated, so that the balls 62 move out from the U-shaped groove upwardly through tower tube 58.

Lower housing 22 contains the mechanism for actuating the testing apparatus and includes at the forward portion a motor 166 which may, for example, be of 1,750 R. P. M. Pinion 168 is actuated by motor 166 to drive gear 169 for operating a suction pump 170. Motor 166 is also connected by flexible coupling 171 to speed reducer 172, the latter being connected by flexible coupling 173 to rotate impeller shaft 162, for example, at such speed that impeller 150 engages successively 60 steel balls 62, 62 per minute. Pump 170 has an intake pipe 174 connecting with suction line 109 and, on the other side, has exhaust 175 to which is fitted a flexible hose 176. The free end of the hose 176 projects into a rectangular box 177 removably mounted in the housing 22. Box 177 serves as a receptacle for glass fragments passing through pipe 119 and for any oil droppings which may be drawn through the system by pump 170. The motor and the actuation of the testing apparatus described is controlled by a switch 178 on the forward exterior of the test cabinet, as shown in Fig. 5, such switch being operatively connected to the motor and any sources of power by suitable conventional wiring, not shown.

Where the method of test is to arrive at a number of blows withstood by the lens or test article, under certain conditions, it is especially convenient to count and automatically register the number of balls 62 directed upon the test article. This is accomplished in the present embodiment by attaching a counter 179, Fig. 1, to the tubular tower and counting the number of balls passing said counter upwardly through tube 58. The counter may be carried on an auxiliary bridge 180 bolted to the vertical members of the tower and carrying a sight window 181 and register 182 therebehind for indicating the number of movements of the counter. Said counter, of course, may be utilized to indicate the total number of balls passing through the machine during any particular period. If the test period is, for example, the maximum life of lens 93, the machine will be operated to drop balls 62 successively through tube 64 upon the lens 93, the counter registering successively. When a ball breaks the test lens, the machine may be stopped and the relative characteristics of the test lens determined by consulting counter register 182. In this connection, it will be apparent that the machine may be utilized for subjecting a succession of lenses 93 or test articles to blows of one or more than one test balls 62. For instance, if the desired test is the subjection of a lens to the blow of a single ball, access to the cabinet for placing the successive lenses on the chuck may readily be obtained by raising the pivotally mounted plates 41. After the test article has been properly located with respect to the tube 64 and/or the chuck 94, the pivoted plate 41 will fall of its own weight again to enclose the test chamber.

Figures 10, 11:
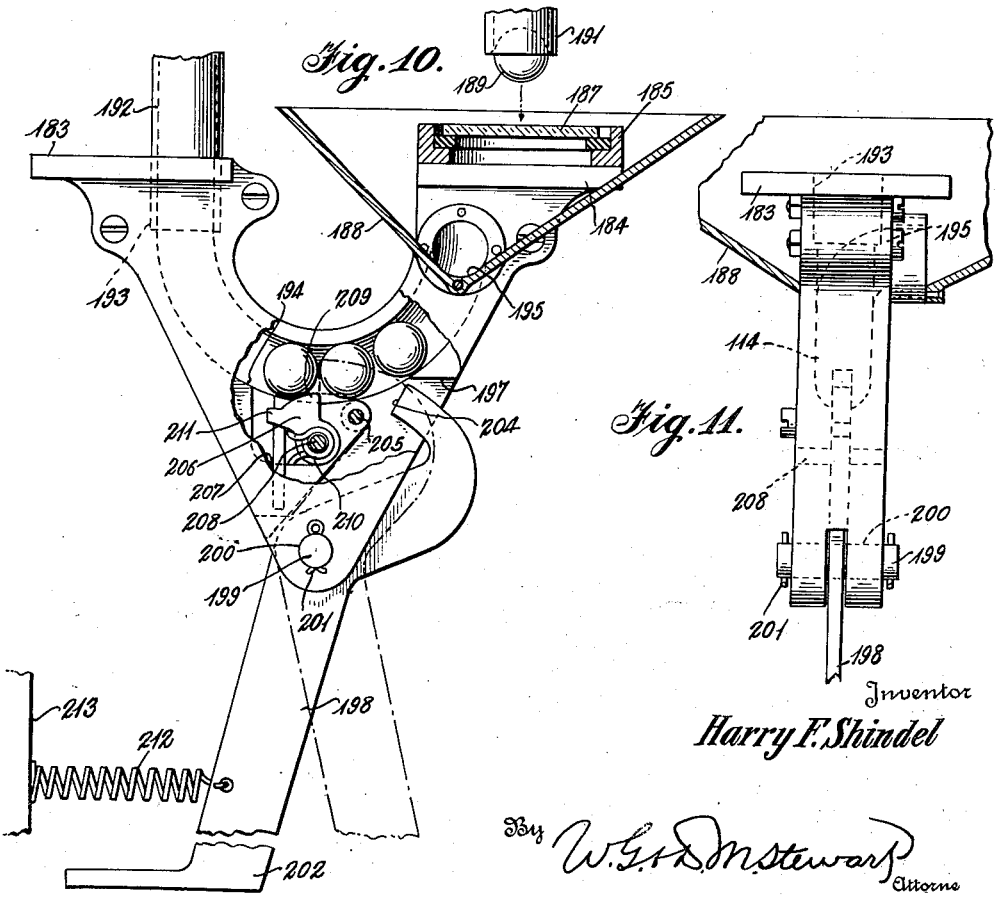
Fig. 10 is a fragmentary view in elevation, somewhat diagrammatic for convenience, of a modified form of apparatus for practicing the invention.
Fig. 11 is an end view of the apparatus as shown in Fig. 10.

When the character of the test permits, the apparatus disclosed in Figs. 10 and 11 may be utilized in practicing the invention. As shown, the alternative form of apparatus includes a fixed horizontal table 183, having at one end a horizontal anvil 184 carrying a test ring 185 for supporting goggle lens 187 or other test article in test position. Anvil 184 is surrounded by a fixed hopper 188 which collects test balls 189 directed by perpendicular tube 191 upon lens 187 disposed with its horizontal plane perpendicular to tube 191. At the opposite end table 183 supports the other end 192 of tube 191. It will be understood that the tube is substantially of inverted U-shape, being carried in socket 193 with disclosed end 191 suspended directly above the test anvil 184. Socket 193 communicates with the bottom of hopper 188 by means of an U-shaped channel 194, extending through the table 183 to aperture 195 at the bottom of the hopper. It will be observed from the drawings that the dimensions of tube 191, socket 193, U-shaped channel 194 and aperture 195 are slightly greater than the diameter of test balls 189, in order that the balls may pass therethrough and be effectually controlled therein by actuating elements operative through slot 197 and including an elongated arm 198 pivoted on pin 199 in hole 200 extending transversely of table 183. Cotter pins 201 at either end of pin 199 maintain the assembly. Arm 198 is actuated by treadle 202 at the lower end, at the upper end having a rearwardly extending pawl 204 swingable longitudinally of slot 197.

When finger 204 is moved contra-clockwise to the position shown in dotted lines in Fig. 10 it engages one of the test balls 189 and carries same a distance not less than the diameter of said ball until fixed stop pin 205 is engaged by arm 198. Check key 206 in recess 207 is pivotally mounted on fixed pin 208 and has nose 209 normally extending in the plane of slot 197 in order to prevent movement of the balls to the right, as shown in Fig. 10. The check key 206 is maintained normally in such position by spring 210 on pin 208 and acting in recess 207 against ear 211 on the key. Treadle 202 is retraced after ball movement operation due to spring 212 fast to any fixed base 213.

From the foregoing it will be observed that when the invention is practiced by the modification set forth in Figs. 10 and 11 a simple method is evolved, particularly suited to manual control and more especially to the single-ball testing of a succession of test articles. While apparatus as shown in Fig. 10 has been successfully practiced by dropping a seven-eighths inch ball for fifty inches upon test article 187, it will be understood that the modified apparatus and steps are readily capable of efficient practice with balls of different dimensions dropped over different distances. For example, all that an operator need do in order to test a series of test articles is place them successively on the anvil and press the treadle 202 against the tension of spring 212, thus pushing one of the balls in U-channel 194 to the left, as shown in Fig. 10. Said ball rides over key nose 209, depressing check key 206 until the ball has passed, after which spring 210 acts on ear 211 to thrust check key again into the plane of the U-channel to prevent the ball from moving backward due to the pressure of balls in the tube 192 thereabove. As the balls move through U-channel 194 and tube 192, they are in contiguous relation until the top of tube 192 is reached. Thereafter, of course, as successive operations of treadle 202 advance additional balls, the upper balls are successively dropped at corresponding intervals through tube 191. After striking test lens 187 the balls collect in hopper 188 in contiguous relation to pass again through U-channel 194.

From the foregoing it might be observed that applicant has presented a testing apparatus which is not only effective in determining the characteristics of articles to be tested, but which is also highly advantageous from the display or advertising standpoints, invoking wonder and curiosity in the minds of observers, while additionally providing a reliable test and record thereof.

What is claimed is:

1. In an apparatus for testing the strength of glass articles, fluid pressure means for mounting a glass article in predetermined position, means for advancing a test tool thereon perpendicularly to the plane of the article in said predetermined position and a single motor for actuating said fluid pressure means and said advancing means.

2. In an apparatus for testing the strength of glass articles, pneumatic means for mounting a glass article in predetermined position, means for advancing a plurality of test tools successively thereon perpendicularly to the plane of the article in said predetermined position, stationary means for collecting said test tools and common means for actuating said pneumatic means and said advancing means.

3. In an apparatus for testing the strength of glass articles, pneumatic means for mounting a glass article in predetermined position, means for advancing a plurality of test tools successively thereon perpendicularly to the plane of the article in said predetermined position, stationary means for collecting said test tools, means for lifting said test tools from the collecting means in contiguous relation and common means for actuating said pneumatic means and said advancing means.

4. In an apparatus for testing goggle lenses, a foundation housing, a test chamber thereabove and a ball feeding tower above said test chamber, means for holding lenses in test position in said chamber, said test chamber having a framework composed of tubular metal of a predetermined character of stock, shatterproof transparent plates arranged in said test chamber, said tower including vertical tubular means composed of stock similar to said predetermined stock and rotary means in said foundation housing for conveying test balls from said test chamber to said tower.

5. In an apparatus for testing glass articles, an anvil for receiving successive articles to be tested and having a horizontal article-receiving surface, test-ball feeding means above said anvil and perpendicularly aligned therewith, a hopper adjacent the anvil, a pivoted arm below said hopper, channel means for receiving balls below said hopper and having a recess for receiving said pivoted arm, means for swinging said pivoted arm through said recess to advance balls therethrough, means for retracting said pivoted arm from ball advancing position and a yieldable retaining element for maintaining said balls in advanced position after retraction of said pivoted arm.

6. In an apparatus for testing goggle lenses by successively dropping a plurality of balls thereon, means for mounting a goggle lens in predetermined testing position, a tubular conduit having an outlet end in spaced perpendicular alignment above the lens and an inlet end below the outlet and mounting a plurality of balls adapted to move through said conduit and drop on the lens, and means for feeding balls to said inlet end after striking the lens and engaging each successive ball to advance the same in the conduit, whereby a previously advanced ball is discharged from the outlet end for each ball entered at the inlet end.

7. In an aparatus for testing specimens by successively dropping a plurality of balls thereon, means for mounting a specimen in predetermined testing position, a conduit having an outlet end in spaced perpendicular alignment above the specimen and an inlet end below the outlet, a plurality of balls adapted to move through said conduit and drop on the specimen, and means for feeding said balls to said inlet end after striking the specimen and sequentially engaging the balls to advance the same in the conduit whereby previously advanced balls may be discharged from the outlet end as the balls are sequentially entered in the inlet end.

HARRY F. SHINDEL.